(12) United States Patent
Steinkellner et al.

(10) Patent No.: US 11,970,106 B2
(45) Date of Patent: Apr. 30, 2024

(54) POSITIONING DEVICE FOR PIVOTING AT LEAST ONE RELEVANT COMPONENT FOR A MOTOR VEHICLE HEADLIGHT

(71) Applicant: ZKW Group GmbH, Wieselburg (AT)

(72) Inventors: Johann Steinkellner, St. Oswald (AT); Lukas Ederer, Loosdorf (AT)

(73) Assignee: ZKW Group GmbH, Wieselburg (AT)

( * ) Notice: Subject to any disclaimer, the term of this patent is extended or adjusted under 35 U.S.C. 154(b) by 66 days.

(21) Appl. No.: 17/783,401

(22) PCT Filed: Dec. 21, 2020

(86) PCT No.: PCT/EP2020/087444
§ 371 (c)(1),
(2) Date: Jun. 8, 2022

(87) PCT Pub. No.: WO2021/148214
PCT Pub. Date: Jul. 29, 2021

(65) Prior Publication Data
US 2023/0014250 A1  Jan. 19, 2023

(30) Foreign Application Priority Data
Jan. 22, 2020 (EP) ..................................... 20153037

(51) Int. Cl.
*B60Q 1/00* (2006.01)
*F16M 13/02* (2006.01)
(Continued)

(52) U.S. Cl.
CPC ......... *B60Q 1/0023* (2013.01); *F16M 13/022* (2013.01); *G01J 1/0271* (2013.01); *G01J 1/42* (2013.01)

(58) Field of Classification Search
CPC .... B60Q 1/0023; B60Q 1/068; F16M 13/022; G01J 1/0271; G01J 1/42; G01J 2001/442; G01D 11/30
(Continued)

(56) References Cited

U.S. PATENT DOCUMENTS 1,786,400 A * 12/1930 Kurtz ..................... B60Q 1/068
362/424
3,655,273 A *  4/1972 Pringle .................. B60R 1/068
74/502.1
(Continued)

FOREIGN PATENT DOCUMENTS

| DE | 2313836 A1 | 9/1973 |
| GB | 552970 A | 5/1943 |
| JP | 2009067204 A | 4/2009 |

OTHER PUBLICATIONS

International Search Report for PCT/EP2020/087444, dated Mar. 24, 2021 (13 pages).
(Continued)

*Primary Examiner* — Muhammad Ijaz
(74) *Attorney, Agent, or Firm* — Eversheds Sutherland (US) LLP

(57) ABSTRACT

A positioning device (10) for pivoting at least one relevant component (20) for a motor vehicle headlight about a first and a second axis (X, Y), comprising
a holding element (100) for a relevant component (20), said holding element comprising a first sliding surface (110), which is designed as part of a spherical surface,
a support frame (200), which comprises a second sliding surface (210), which is designed as part of a spherical surface, the holding element (100) being supported in the support frame (200) by means of a bearing apparatus such that the first sliding surface (110) of the holding element (100) can be displaced along the
(Continued)

Figure 1:
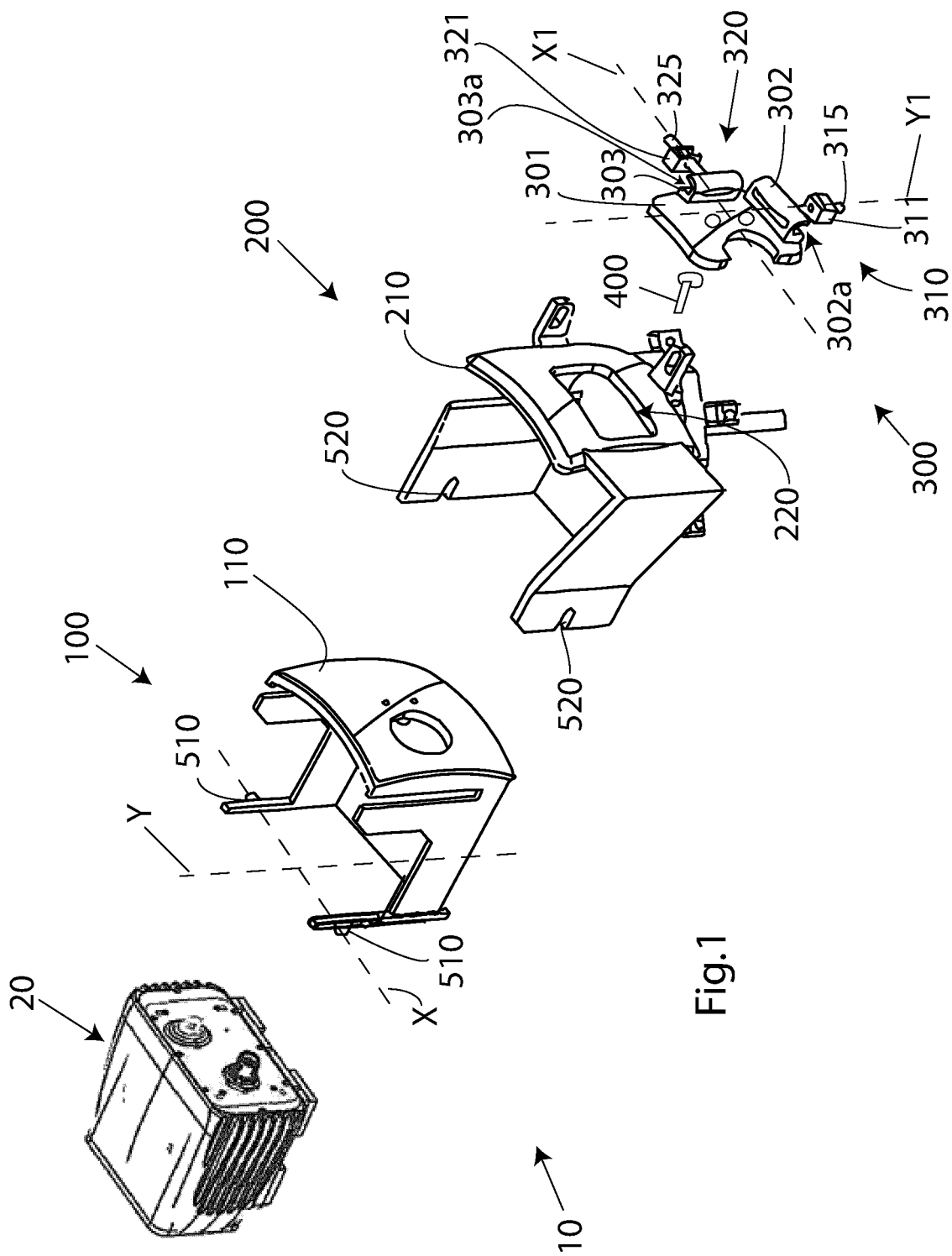

second sliding surface (210) of the support frame (200) about the first and second axis (X, Y), an adjusting apparatus (300), which has a positioning component (301) and a first moving apparatus (310) and a second moving apparatus (320), which are each arranged on the positioning component (301), which is mechanically connected to the holding element (100) by means of a connecting element (400), wherein the connecting element (400) passes through the support frame (200) via an opening (220), wherein the connecting element (400) is designed to transmit a movement of the positioning component (301) to the holding element (100), and wherein the connecting element is designed as a screw means, wherein the positioning component can be brought into a released state and a fastened state, wherein the positioning component can be displaced when in the released state, and the positioning component (301) can be clamped immovably against the support frame when in the fastened state by tightening the screw means.

15 Claims, 3 Drawing Sheets

(51) Int. Cl.
*G01J 1/02* (2006.01)
*G01J 1/42* (2006.01)

(58) Field of Classification Search
USPC .................................................. 248/205.1
See application file for complete search history.

(56) References Cited

U.S. PATENT DOCUMENTS

| | | | |
|---|---|---|---|
| 11,420,550 B2* | 8/2022 | Berger | B60Q 1/068 |
| 2005/0231936 A1* | 10/2005 | Cajanek | B60Q 1/068 |
| | | | 362/37 |
| 2011/0063866 A1* | 3/2011 | Shibata | B60Q 1/076 |
| | | | 362/523 |
| 2020/0384910 A1 | 12/2020 | Berger | |
| 2022/0243867 A1* | 8/2022 | Tsorng | F16M 11/18 |
| 2023/0014250 A1* | 1/2023 | Steinkellner | F16M 13/022 |
| 2023/0108928 A1* | 4/2023 | Rebiffe | H02K 11/0094 |
| | | | 248/278.1 |
| 2023/0305371 A1* | 9/2023 | Tseng | F16M 11/041 |

OTHER PUBLICATIONS

Search Report for European Patent Application No. 20153037.5 dated Jul. 17, 2020 (7 pages).

* cited by examiner

POSITIONING DEVICE FOR PIVOTING AT LEAST ONE RELEVANT COMPONENT FOR A MOTOR VEHICLE HEADLIGHT The invention relates to a positioning device for pivoting at least one relevant component for a motor vehicle headlight about a first and a second axis, comprising:
- a holding element for displaceably holding the at least one relevant component, said holding element comprising a first sliding surface of a surface pair, said first sliding surface being designed as part of a spherical surface,
- a support frame for accommodating the holding element, the support frame comprising a second sliding surface of the surface pair, said second sliding surface being designed as part of a spherical surface and corresponding to the first sliding surface, the holding element being supported in the support frame by means of a bearing apparatus such that the first sliding surface of the holding element can be displaced along the second sliding surface of the support frame about the first and second axis, and
- an adjusting apparatus for pivoting the relevant component about the first and the second axis, said adjusting apparatus having a positioning component and a first moving apparatus and a second moving apparatus, said first and second moving apparatuses being arranged on the positioning component, the positioning component being mechanically connected to the holding element by means of a connecting element.

The invention also relates to a lighting device for a motor vehicle headlight, comprising at least one positioning device according to the invention.

The invention further relates to a sensor device for a motor vehicle headlight, comprising at least one positioning device according to the invention and a relevant component in the form of a sensor.

The invention furthermore relates to a motor vehicle headlight having at least one lighting device according to the invention and/or at least one sensor device according to the invention.

Positioning systems are known from the prior art and are often used in motor vehicle headlights to set the vertical deflection (for example, lighting range regulation) or the horizontal deflection (basic setting or, for example, bending light) of a light distribution.

On the one hand, positioning systems should allow reliable movement of a relevant component, and on the other hand, the space requirement of such positioning systems should be minimised so that the design of a motor vehicle headlight is limited as little as possible.

Previous positioning systems usually have a movement triangle with a fixed bearing point and two points of action, the connection between the fixed bearing point and the point of action in each case forming an axis, and a pivoting movement being produced by displacing the points of action. Such positioning systems have a certain space requirement owing to the formation of the pivot triangle.

It is therefore an object of the invention to create a positioning system which has a reduced space requirement.

This object is achieved in that the connecting element passes through the support frame at the second sliding surface via an opening in the support frame, wherein the connecting element is designed to transmit a movement of the positioning component to the holding element, and wherein the connecting element is designed as a screw means, wherein the positioning component in connection with the screw means can be brought into a released state and a fastened state, wherein the positioning component can be displaced by the first and second moving apparatuses when in the released state, and the positioning component can be clamped immovably against the support frame when in the fastened state by tightening the screw means.

By departing from a traditional structure with moving arms and bearing points forming a movement triangle and replacing it according to the invention with holding element which can be displaced along a spherical surface, the installation volume of a positioning system can be considerably reduced.

Relevant components are considered to be in particular screens; light sources, in particular LED and/or laser light sources; reflectors; lenses; and/or entire light modules or assemblies; or sensors or light sensors (photodetectors), etc. One or a plurality of these mentioned components can therefore form the relevant component which is movable with the aid of the positioning system.

The movement of the relevant component by means of the first moving apparatus takes place independently of a movement by means of the second moving apparatus, i.e., the movement apparatuses function independently of each other. Both moving apparatuses should preferably not influence each other.

To displace the positioning component—that is, in the released state—the screw means is loosened but only so that the holding element and the positioning component are still connected to each other but the positioning component can be displaced.

If the clamping—that is, the fastened state—is then undone so that the holding element and the positioning component are still (loosely) connected to each other, the positioning component can be displaced by the first and the second moving apparatus.

It can be provided for the bearing apparatus to have a first and a second bearing means, which are mechanically engaged with each other and are designed to support the holding element on the support frame rotatably about the first and the second axis, wherein the first bearing means is arranged on the holding element, and the second bearing means is arranged on the support frame.

It can be provided for the first bearing means to be designed as protrusions and for the second bearing means to be designed as recesses, preferably elongate recesses, corresponding to the respective protrusions, wherein the protrusions are supported in the respective recesses.

It can be provided for in each case two protrusions of the holding element to extend along the first axis on mutually opposing sides of the holding element.

It can be provided for the respective two protrusions arranged on opposing sides of the holding element to form the first axis, wherein, when the holding element is rotated about the second axis, the first axis and thus the two protrusions are also moved about the second axis, wherein the protrusions are rotated or moved in the corresponding recesses for them.

It can be provided for at least one protrusion, in particular exactly one protrusion, preferably two protrusions, of the holding element to be arranged along the second axis.

It can be provided for the first moving apparatus to comprise a transmission element which is stationary relative to the support frame and an actuating element which is mechanically engaged with the transmission element, wherein the actuating element is designed to act on the positioning component by means of a coupling element, and wherein the actuating element has a threaded section, and the transmission element has a mating threaded section corresponding to the threaded section, wherein the actuating element is supported rotatably and displaceably in the transmission element by means of the mating threaded section, wherein the transmission element in combination with the actuating element is designed to convert a rotary movement of the actuating element into a displacement movement along a first displacement axis, wherein a displacement movement of the actuating element of the first moving apparatus along the first displacement axis effects a pivoting of the holding element about the first axis.

It can be provided for the second moving apparatus to comprise a transmission element which is stationary relative to the support frame and an actuating element which is mechanically engaged with the transmission element, wherein the actuating element is designed to act on the positioning component by means of a coupling element, and wherein the actuating element has a threaded section, and the transmission element has a mating threaded section corresponding to the threaded section, wherein the actuating element is supported rotatably and displaceably in the transmission element by means of the mating threaded section, wherein the transmission element in combination with the actuating element is designed to convert a rotary movement of the actuating element into a displacement movement along a second displacement axis, wherein a displacement movement of the actuating element of the second moving apparatus along the second displacement axis effects a pivoting of the holding element about the second axis.

It can be provided for the coupling element of each actuating element to be supported in a guide apparatus of the positioning component, said guide apparatus having a guide groove and being designed, when the positioning component is displaced in a direction orthogonal to the corresponding displacement axis of the actuating element, to guide the coupling in the guide groove in said direction.

It can be provided for the actuating element to be in the form of a screw with the coupling element in the form of a spherical head; preferably it is a spherical-head screw.

It can be provided for the guide groove to have a circular-arc-shaped profile, preferably corresponding to the first and the second sliding surface.

This has the advantage that the respective actuating elements of the first and second moving apparatuses do not catch or stick in the guide grooves when the positioning component moves, and therefore further movement of the positioning component is possible.

It can be provided for the first and the second axis to be arranged orthogonally to each other, wherein preferably the first and the second axis intersect and form a common intersection point.

Preferably, the relevant component has a side or side surface which is relevant for the respective use of the relevant component.

It can also be provided for the intersection point of the intersecting first and second axes to be arranged on the relevant side or side surface of the relevant component. Preferably, the relevant component is a sensor apparatus or a sensor, wherein the sensor has a sensor surface in order to detect photons, for example. The intersection point of the first and the second axis in this case lies on the sensor surface, preferably in the geometric centre of this sensor surface.

A pivoting movement—about the first and/or second axis—in this case means that the point of the sensor surface in which the intersection point is arranged changes only in orientation but not in position.

It can be provided for the first and second displacement axes to be arranged orthogonally to each other.

The object is likewise achieved with a lighting device for motor vehicle headlight, comprising at least one positioning device and a relevant component.

The object is likewise achieved with a sensor device for a motor vehicle headlight, comprising at least one positioning device and a relevant component in the form of a sensor.

The object is likewise achieved with a motor vehicle headlight having at least one lighting device and/or at least one sensor device.

Figure 2:
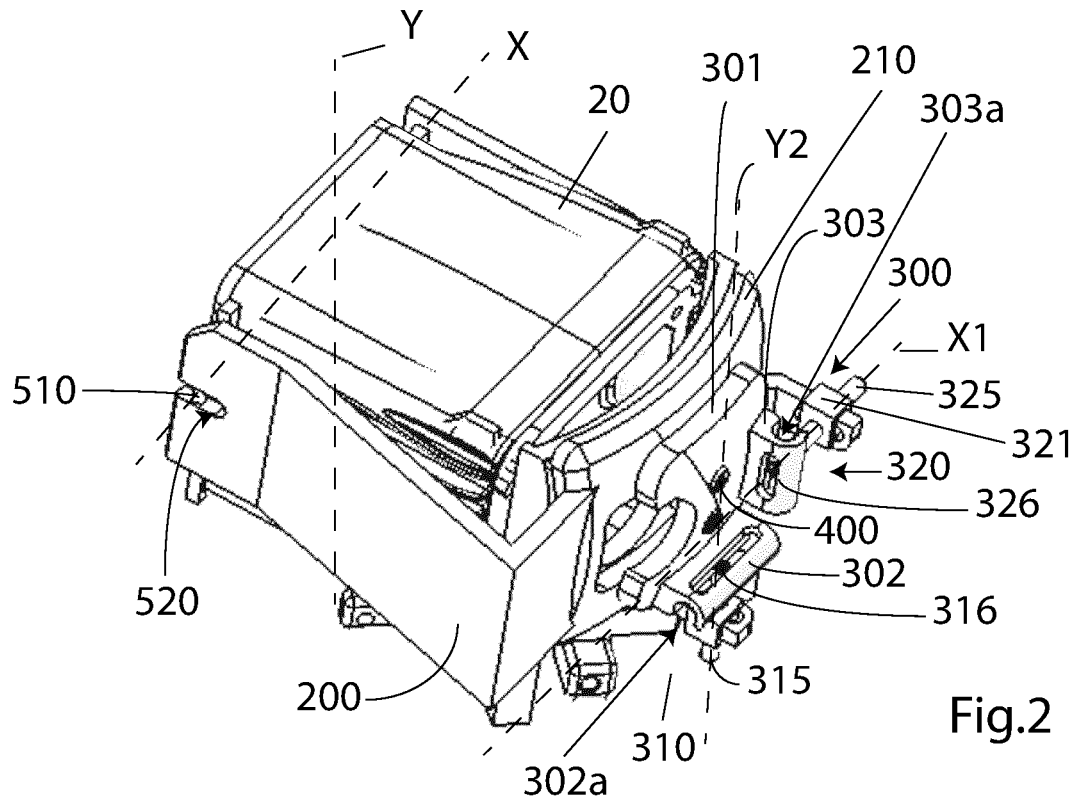
Figure 3:
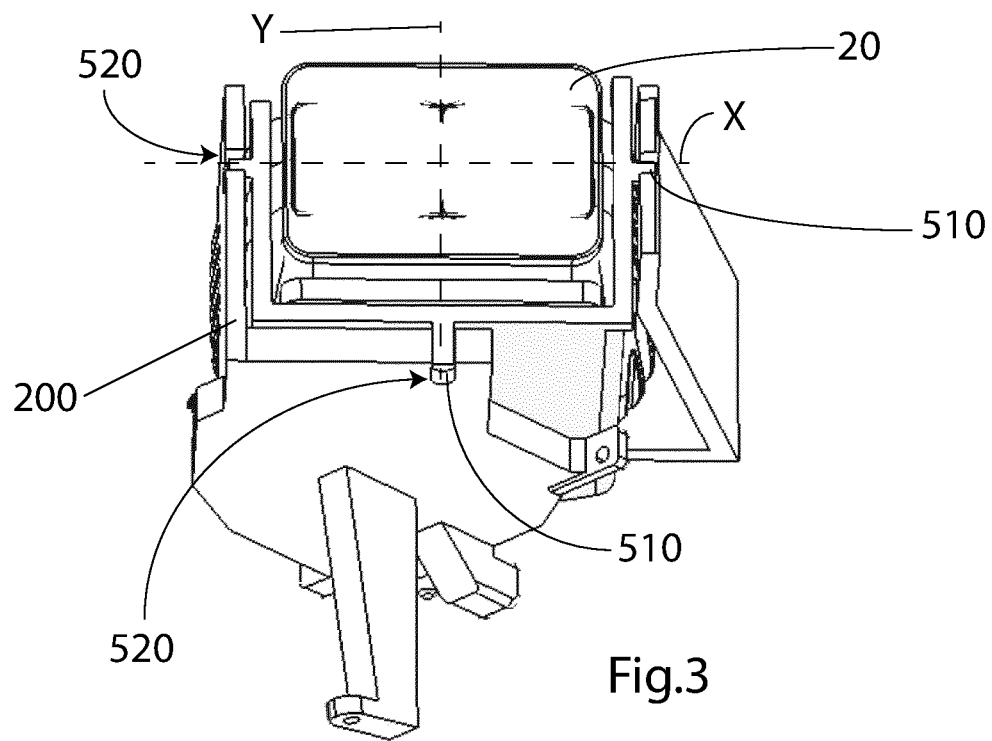
Figure 4:
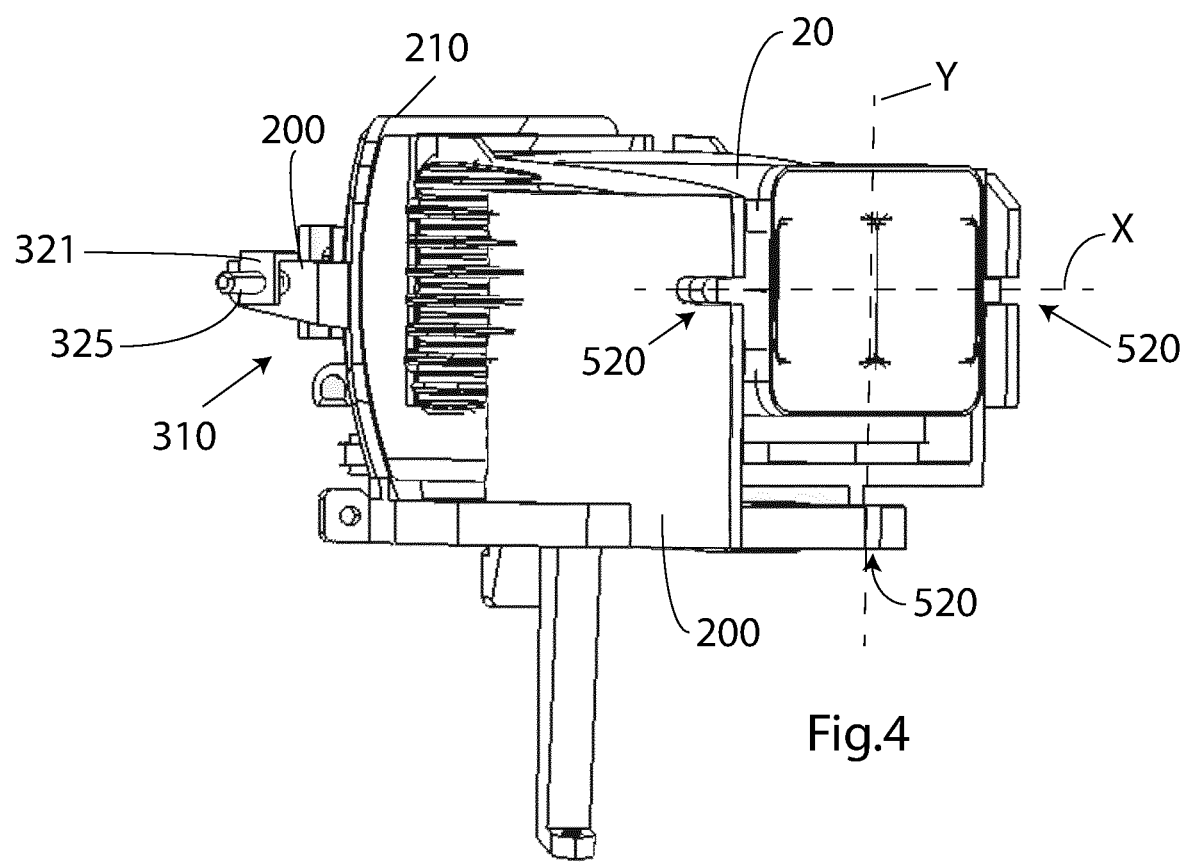

The invention is explained in more detail below using exemplary drawings. In the figures, FIG. 1 shows an exploded view of an exemplary positioning device, FIG. 2 shows a perspective view of the exemplary positioning device in an assembled state from the side and the rear, FIG. 3 shows a perspective view of the positioning device of FIG. 2, from the front and from below, and FIG. 4 shows a perspective view of the positioning device of FIG. 2, from the front and from the side.

FIG. 1 shows an exemplary positioning device 10 for pivoting a relevant component 20 for a motor vehicle headlight about a first and a second axis X, Y in an exploded view.

The positioning device 10 comprises a holding element 100 for displaceably holding the at least one relevant component 20, which is in the form of a sensor in the example shown, the holding element 100 comprising a first sliding surface 110 of a surface pair, said first sliding surface being designed as part of a spherical surface. The first sliding surface 110 can only be seen from the rear in FIG. 1.

The positioning device 10 also comprises a support frame 200 for accommodating the holding element 100, the support frame 200 comprising a second sliding surface 210 of the surface pair, said second sliding surface being designed as part of a spherical surface and corresponding to the first sliding surface 110, the holding element 100 being supported by means of a bearing apparatus in the support frame 200 such that the first sliding surface 110 of the holding element 100 can be displaced along the second sliding surface 210 of the support frame 200 about the first and the second axis X, Y.

The bearing apparatus comprises a first and a second bearing means 510, 520, which are mechanically engaged with each other and are designed to support the holding element 100 on the support frame 200 rotatably about the first and the second axis X, Y, the first bearing means 510 being arranged on the holding element 100, and the second bearing means 520 being arranged on the support frame 200. In the example shown in the figures, the first bearing means is in the form of protrusions 510, and the second bearing means is in the form of elongate recesses 520 corresponding to the respective protrusions 510, the protrusions 510 being supported in the respective recesses 520 when the positioning device 10 is in the assembled state; see the other figures.

Also, two protrusions 510 of the holding element 100 in each case extend along the first axis X on mutually opposing sides of the holding element 100, or these protrusions 510 form the first axis X, wherein, when the holding element 100 rotates or pivots about the second axis Y, the first axis X and thus the said two protrusions 510 are also moved. In the process, the protrusions 510 are displaced into the corresponding recesses 520 provided therefor.

Visible in FIG. 3 rather than FIG. 1 is one protrusion 510, which is situated on the underside of the holding element 100 and extends along the second axis Y, wherein, when the holding element 100 rotates or pivots about the first axis X, the second axis Y and thus the said protrusion 510 are also moved. In the process, the protrusion 510 is displaced in into the corresponding recess 520 provided therefor.

To pivot the sensor 20 or the holding element 100 about the first and second axes X, Y, the positioning device 10 also comprises an adjusting apparatus 300, said adjusting apparatus 300 having a positioning component 301 and a first moving apparatus 310 and a second moving apparatus 320, said first and second moving apparatuses 310, 320 being arranged on the positioning component 301, the positioning component 301 being mechanically connected to the holding element 100 by means of a connecting element 400.

The connecting element 400 passes through the support frame 200 at the second sliding surface 210 via an opening 220 in the support frame 200, wherein the connecting element 400 is designed to transmit a movement of the positioning component 301 to the holding element 100; in this case the connecting element 400 is designed as a rigid body.

Furthermore, the connecting element 400 is designed as a screw means, wherein the positioning component 301 in connection with the screw means 400 can be brought into a released state and into a fastened state. In the released state, the positioning component 301 can be displaced by the first and second moving apparatuses 310, 320. In the fastened state, the positioning component 301 can be clamped immovably against the support frame 200 by tightening the screw means 400, wherein, when the screw means 400 is tightened, the second sliding surface 210 of the support frame is clamped from one side by the holding element 100 or by the first sliding surface 110 and from the other side by the positioning component 301.

FIG. 2 shows an assembled state of the positioning device 10 in a perspective view from the rear and from the side, in which the adjusting device 300 and the first and second moving apparatuses 310, 320 can be seen more clearly.

The first moving apparatus 310 comprises a transmission element 311 which is stationary relative to the support frame 200 and an actuating element 315 which is mechanically engaged with the transmission element 311. The actuating element 315 is designed to act on the positioning component 301 by means of a coupling element 316, wherein the actuating element 315 has a threaded section, and the transmission element 311 has a mating threaded section corresponding to the threaded section. The actuating element 315 is supported rotatably and displaceably in the transmission element 311 by means of the mating threaded section, wherein the transmission element 311 in combination with the actuating element 315 is designed to convert a rotary movement of the actuating element 315 into a displacement movement along a first displacement axis Y1, wherein a displacement movement of the actuating element 315 of the first moving apparatus 310 along the first displacement axis Y1 effects a pivoting of the holding element 100 about the first axis X.

The second moving apparatus 320 comprises a transmission element 321 which is stationary relative to the support frame 200 and an actuating element 325 which is mechanically engaged with the transmission element 321. The actuating element 325 is designed to act on the positioning component 301 by means of a coupling element 326, wherein the actuating element 325 has a threaded section, and the transmission element 321 has a mating threaded section corresponding to the threaded section 326. The actuating element 325 is supported rotatably and displaceably in the transmission element 321 by means of the mating threaded section, wherein the transmission element 321 in combination with the actuating element 325 is designed to convert a rotary movement of the actuating element 325 into a displacement movement along a second displacement axis X1, wherein a displacement movement of the actuating element 325 of the second moving apparatus 320 along the second displacement axis X1 effects a pivoting of the holding element 100 about the second axis Y.

In the first and second moving apparatuses 310, 320, the coupling element 316, 326 of each actuating element 315, 325 is supported in a guide apparatus 302, 303 of the positioning component 301. The guide apparatus 302, 303 has, for each actuating element 315, 325, a guide groove 302a, 303a, which has a circular-arc-shaped profile and is designed, when the positioning component 301 is displaced in a direction orthogonal to the corresponding displacement axis X1, Y1 of the actuating element 315, 325, to guide the coupling element 316, 326 in the guide groove 302a, 303a in said direction. The first and second displacement axes Y1, X1 are arranged orthogonally to each other.

In the example shown in the figures, the actuating elements 315, 325 are in the form of screws with the respective coupling element 316, 326 in the form of a spherical head; preferably it is a spherical-head screw.

FIG. 3 shows the positioning device 10 in an assembled state in a perspective view from the front, in which it can be seen that the first and second axes X, Y are orthogonal to each other, the first and second axes X, Y intersecting and forming a common intersection point.

The intersection point of the intersecting first and second axes X, Y is situated on a sensor surface of the sensor 20. The sensor is, for example, the surface which can detect photons. In the example shown in FIG. 3, the intersection point is situated in the geometric centre of this sensor surface.

A pivoting movement—about the first and/or second axis—in this case means that the point of the sensor surface in which the intersection point is arranged changes only in orientation but not in position.

FIG. 4 shows a perspective side view of the assembled positioning device 10.

It should be noted that terms such as "top", "bottom", "side" and "rear" should be understood in relation to a positioning device installed as intended in a motor vehicle headlight.

The invention claimed is:

1. A positioning device (10) for pivoting at least one relevant component (20) for a motor vehicle headlight about a first and a second axis (X, Y), comprising:
   a holding element (100) for displaceably holding the at least one relevant component (20), said holding element (100) comprising a first sliding surface (110) of a surface pair, said first sliding surface being designed as part of a first spherical surface;
   a support frame (200) for accommodating the holding element (100), the support frame (200) comprising a second sliding surface (210) of the surface pair, said second sliding surface being designed as part of a second spherical surface and corresponding to the first sliding surface (110), the holding element (100) being supported in the support frame (200) by a bearing apparatus such that the first sliding surface (110) of the holding element (100) can be displaced along the second sliding surface (210) of the support frame (200) about the first and second axis (X, Y); and an adjusting apparatus (300) for pivoting the relevant component (20) about the first and the second axis (X, Y), said adjusting apparatus (300) having a positioning component (301) and a first moving apparatus (310) and a second moving apparatus (320), said first and second moving apparatuses (310, 320) being arranged on the positioning component (301), the positioning component (301) being mechanically connected to the holding element (100) by means of a connecting element (400), wherein the connecting element (400) passes through the support frame (200) at the second sliding surface (210) via an opening (220) in the support frame (200), wherein the connecting element (400) is designed to transmit a movement of the positioning component (301) to the holding element (100), and wherein the connecting element is designed as a screw means, wherein the positioning component in connection with the screw means can be brought into a released state and a fastened state, wherein the positioning component (301) can be displaced by the first and second moving apparatuses (310, 320) when in the released state, and the positioning component (301) can be clamped immovably against the support frame (200) when in the fastened state by tightening the screw means.

2. The positioning device according to claim 1, wherein the bearing apparatus comprises a first and a second bearing means (510, 520), which are mechanically engaged with each other and are designed to support the holding element (100) on the support frame (200) rotatably about the first and the second axis (X, Y), wherein the first bearing means (510) is arranged on the holding element (100), and the second bearing means (520) is arranged on the support frame (200).

3. The positioning device according to claim 2, wherein the first bearing means is designed as protrusions (510), and the second bearing means is designed as recesses (520) corresponding to the respective protrusions (510), wherein the protrusions (510) are supported in the respective recesses (520).

4. The positioning device according to claim 3, wherein the recesses (520) are elongate recesses.

5. The positioning device according to claim 1, wherein the first moving apparatus (310) comprises a transmission element (311) which is stationary relative to the support frame (200) and an actuating element (315) which is mechanically engaged with the transmission element (311), wherein the actuating element (315) is designed to act on the positioning component (301) by means of a coupling element (316), and wherein the actuating element (315) has a threaded section, and the transmission element (311) has a mating threaded section corresponding to the threaded section, wherein the actuating element (315) is supported rotatably and displaceably in the transmission element (311) by the mating threaded section, wherein the transmission element (311) in combination with the actuating element (315) is designed to convert a rotary movement of the actuating element (315) into a displacement movement along a first displacement axis (Y1), wherein a displacement movement of the actuating element (315) of the first moving apparatus (310) along the first displacement axis (Y1) effects a pivoting of the holding element (100) about the first axis (X).

6. The positioning device according to claim 5, wherein the second moving apparatus (320) comprises a transmission element (321) which is stationary relative to the support frame (200) and an actuating element (325) which is mechanically engaged with the transmission element (321), wherein the actuating element (325) is designed to act on the positioning component (301) by a coupling element (326), and wherein the actuating element (325) has a threaded section, and the transmission element (321) has a mating threaded section corresponding to the threaded section (326), wherein the actuating element (325) is supported rotatably and displaceably in the transmission element (321) by the mating threaded section, wherein the transmission element (321) in combination with the actuating element (325) is designed to convert a rotary movement of the actuating element (325) into a displacement movement along a second displacement axis (X1), wherein a displacement movement of the actuating element (325) of the second moving apparatus (320) along the second displacement axis (X1) effects a pivoting of the holding element (100) about the second axis (Y).

7. The positioning device according to claim 6, wherein the coupling element (316, 326) of each actuating element (315, 325) is supported in a guide apparatus (302, 303) of the positioning component (301), said guide apparatus (302, 303) having a guide groove (302a, 303a) and being designed, when the positioning component (301) is displaced in a direction orthogonal to at least one of: the first displacement axis (Y1) or the second displacement axis (X1) of the actuating element (315, 325), to guide the coupling element (316, 326) in the guide groove (302a, 303a) in said direction.

8. The positioning device according to claim 7, wherein the guide groove (302a, 303a) has a circular-arc-shaped profile.

9. The positioning device according to claim 5, wherein the first and second displacement axes (Y1, X1) are orthogonal to each other.

10. The positioning device according to claim 5, wherein the actuating element (315, 325) is in a form of a screw with the coupling element (316, 326) in a form of a spherical head.

11. The positioning device according to claim 1, wherein the first and second axes (X, Y) are orthogonal to each other.

12. A lighting device for a motor vehicle headlight, comprising:
at least one positioning device according to claim 1; and
the at least one relevant component.

13. A sensor device for a motor vehicle headlight, comprising:
at least one positioning device according to claim 1, wherein the at least one relevant component is a sensor.

14. A motor vehicle headlight having at least one lighting device according to claim 12.

15. A motor vehicle headlight having at least one sensor device according to claim 13.

* * * * *